United States Patent
Amano et al.

(10) Patent No.: US 9,982,765 B2
(45) Date of Patent: May 29, 2018

(54) FLUID COUPLING

(71) Applicant: TOYOTA JIDOSHA KABUSHIKI KAISHA, Toyota-shi (JP)

(72) Inventors: Hiroyuki Amano, Toyota (JP); Yu Miyahara, Toyota (JP); Shingo Aijima, Toyota (JP); Hirotsugu Yoshino, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 273 days.

(21) Appl. No.: 14/784,807

(22) PCT Filed: Apr. 22, 2013

(86) PCT No.: PCT/JP2013/061743
§ 371 (c)(1),
(2) Date: Oct. 15, 2015

(87) PCT Pub. No.: WO2014/174563
PCT Pub. Date: Oct. 30, 2014

(65) Prior Publication Data
US 2016/0053878 A1 Feb. 25, 2016

(51) Int. Cl.
*F16H 45/02* (2006.01)
*F16F 15/14* (2006.01)

(52) U.S. Cl.
CPC ............ *F16H 45/02* (2013.01); *F16F 15/145* (2013.01); *F16H 2045/0205* (2013.01);
(Continued)

(58) Field of Classification Search
None
See application file for complete search history.

(56) References Cited

U.S. PATENT DOCUMENTS 4,252,227 A * 2/1981 Staub, Jr. .............. F16D 13/686
192/209
5,103,693 A 4/1992 Hibi
(Continued)

FOREIGN PATENT DOCUMENTS

DE 2014218743 * 3/2016 .............. F16F 15/12
JP 2-236049 A 9/1990
(Continued)

OTHER PUBLICATIONS

International Search Report dated Jul. 9, 2013, in PCT/JP2013/061743 filed Apr. 22, 2013.

*Primary Examiner* — Robert W Hodge
*Assistant Examiner* — Ryan P Dodd
(74) *Attorney, Agent, or Firm* — Oblon, McClelland, Maier & Neustadt, L.L.P.

(57) ABSTRACT

An object is to provide a fluid coupling capable of effectively utilizing an internal space of a cover member and of sufficiently exerting a performance of a device damping torsional vibration. In a fluid coupling including a cover member accommodating a fluid, a pump impeller, a turbine runner, a lockup clutch operated by a fluid pressure and selectively connecting the cover member and an output shaft, a damper mechanism having an elastic member, and a pendulum damper having a rotary member rotating integrally with the output shaft and an inertial mass capable of relative rotation with respect to the output shaft, the turbine runner, the damper mechanism, the lockup clutch, and the pendulum damper are arranged in this order in an axial direction of the output shaft inside the cover member.

6 Claims, 2 Drawing Sheets

(52) U.S. Cl.
CPC ............... *F16H 2045/0226* (2013.01); *F16H 2045/0263* (2013.01); *F16H 2045/0278* (2013.01)

(56) References Cited

U.S. PATENT DOCUMENTS

| | | | |
|---|---|---|---|
| 6,026,940 A * | 2/2000 | Sudau | F16F 15/145 |
| | | | 192/3.28 |
| 7,878,313 B2 | 2/2011 | Cmich | |
| 2009/0020385 A1 * | 1/2009 | Nakamura | F16H 45/02 |
| | | | 192/3.29 |
| 2010/0236228 A1 | 9/2010 | Degler et al. | |
| 2012/0043173 A1 * | 2/2012 | Jameson | F16H 45/02 |
| | | | 192/3.23 |
| 2012/0080282 A1 * | 4/2012 | Takikawa | F16H 45/02 |
| | | | 192/3.28 |
| 2012/0111684 A1 | 5/2012 | Kombowski et al. | |
| 2016/0333962 A1 * | 11/2016 | Oh | F16F 15/13484 |

FOREIGN PATENT DOCUMENTS

| | | |
|---|---|---|
| JP | 11-311309 A | 11/1999 |
| JP | 2002-340097 A | 11/2002 |
| JP | 2011-504986 A | 2/2011 |
| JP | 2012-77823 A | 4/2012 |
| JP | 2012-533037 A | 12/2012 |

* cited by examiner

FLUID COUPLING

TECHNICAL FIELD

The present invention relates to a fluid coupling provided with a device for damping torsional vibration inside a cover member.

BACKGROUND ART

A rotary member such as a driving shaft and a gear for transmitting a torque generated in a power source to an intended spot or member unavoidably vibrates due to fluctuation of the input torque itself, fluctuation of a load or friction. A frequency of the vibration changes in accordance with a rotation speed and since higher-mode vibration of secondary vibration or more is generated at the same time, amplitude becomes larger by resonance and hence, noise or deterioration of durability can be caused. Thus, a device or a mechanism for preventing vibration as described above is widely employed in various types of equipment for transmitting power by rotation. Particularly, a fluid coupling provided with a device for damping such torsional vibration inside a cover member is known. Examples thereof are described in Japanese Patent Laid-Open No. 2012-77823, Japanese Patent Laid-Open No. 2011-504986, and Japanese Patent Laid-Open No. 2012-533037.

For example, Japanese Patent Laid-Open No. 2012-77823 describes provision of a dynamic damper and a centrifugal pendulum damper inside the cover member of the fluid coupling with a pump shell and a turbine runner arranged facing each other and arrangement of the dynamic damper being adjacent to the turbine runner. Moreover, in the fluid coupling, a lockup piston is arranged so as to be frictionally engaged with an inner surface of a front cover, and the centrifugal pendulum damper is arranged between the lockup piston and the dynamic damper.

Moreover, Japanese Patent Laid-Open No. 2011-504986 describes a power transmission device in which a rotation speed adaptive type vibration absorber formed by a centrifugal force pendulum device is arranged so as to be adjacent to a turbine wheel in an axial direction. In the power transmission device, a damper device having an elastic member is arranged between a lockup clutch frictionally engaged with a front cover in the axial direction and a rotation speed adaptive type vibration absorber. Moreover, Japanese Patent Laid-Open No. 2012-533037 describes a torque transmission device in which a vibration absorber formed by a centrifugal pendulum and a torsional vibration damper are arranged so as to overlap in a radial direction. In the torque transmission device, the vibration absorber and the torsional vibration damper are arranged between a turbine runner and a converter lockup clutch in the axial direction.

As described in each of the aforementioned Patent Literatures, in the fluid coupling provided with a device for damping torsional vibration inside the cover member, a space for arranging the fluid coupling in a vehicle is restricted, and hence effective use of an internal space of the cover member of the fluid coupling is in demand. That is, inside the cover member, the space for arranging the device for damping the torsional vibration is restricted.

According to Japanese Patent Laid-Open No. 2011-504986 and Japanese Patent Laid-Open No. 2012-533037, a space between the turbine runner and the cover member in the radial direction is not effectively utilized. On the other hand, in the structure described in Japanese Patent Laid-Open No. 2012-77823, a part of the dynamic damper is arranged in a space between the turbine runner and the cover member.

However, in the structure described in Japanese Patent Laid-Open No. 2012-77823, an engagement portion connecting the dynamic damper and the lockup piston covers an outer peripheral side of the centrifugal pendulum damper, and therefore an outer diameter of the centrifugal pendulum damper is restricted by the engagement portion. Therefore, distances from rotational centers of a pump impeller and the turbine runner to a mass body which is the pendulum member become short, and it is likely that an inertial moment by the centrifugal pendulum damper runs short.

DISCLOSURE OF THE INVENTION

The present invention was made in view of the aforementioned technical problems and has an object to provide a fluid coupling which effectively utilizes an internal space of the cover member and in which a device for damping torsional vibration provided inside the cover member can sufficiently exert performances of vibration damping.

In order to solve the aforementioned problems, according to the present invention, the fluid coupling comprises: a cover member connected to an input member and accommodating a fluid; a drive impeller that creates a spiral flow by a rotation of the cover member; a driven impeller connected to an output member including a rotary shaft and rotated by the spiral flow; a lockup clutch hydraulically actuated to selectively provide a connection between the cover member and the output member; a damper mechanism having an input element connected to the lockup clutch, an output element connected to the output member, and an elastic member arranged between the input element and the output element in such a manner to be expanded and compressed in a rotational direction; and a pendulum damper having an inertial mass oscillating with respect to the output member, that is connected to the output member to be rotated in the rotational direction of the output member. In order to achieve the above-mentioned objective, according to the present invention, the driven impeller, the damper mechanism, the lockup clutch, and the pendulum damper are arranged in order in the axial direction of the rotary shaft in the cover member.

The cover member may include a plate member protruding toward a rotation center axis of the rotary shaft to serve as an engagement surface of the lockup clutch.

The plate member may be arranged between the lockup clutch and the pendulum damper in the axial direction.

In addition, an internal space of the cover member may be divided into a first chamber accommodating the driven impeller and the damper mechanism and a second chamber accommodating the pendulum damper by the plate member and the lockup clutch, by bringing the lockup clutch into engagement.

The cover member may include a first cover member covering an outer peripheral side of the pendulum damper, a second cover member integrated with the driving-side impeller to cover an outer peripheral side of the driven impeller, and a third cover member integrated with the plate member to cover an outer peripheral side of the lockup clutch.

Specifically, an inner diameter of the first cover member may be larger than that of the third cover member.

As described, the driven impeller, the damper mechanism, the lockup clutch, and the pendulum damper are arranged in order in the axial direction of the rotary shaft in the cover member. Consequently, the axial length of the fluid coupling can be reduced.

Moreover, in the axial direction, since the plate member serving as an engagement surface of the lockup clutch is arranged between the damper mechanism and the pendulum damper in the axial direction, the internal space in the radial direction between the driven impeller and the cover member can be utilized to arrange the damper mechanism therein and, the internal space of the cover member in the radial direction can be utilized as a space for arranging the pendulum damper. That is, since the pendulum damper and the first cover member are arranged so as to face each other in the radial direction, the space for arranging the pendulum damper is not interfered with the structure of the damper mechanism or the lockup clutch. Therefore, since the pendulum damper can be utilized the internal space of the cover member in the radial direction, the distance from the rotation center of the rotary member of the pendulum damper to the inertial mass can be made larger, and an inertial moment by the pendulum damper acting on the output member can be made larger. That is, the internal space of the fluid coupling can be effectively utilized, and the damping performance of the torsional vibration by the pendulum damper can be sufficiently exerted. Moreover, since a fluid such as operating oil is also interposed on a rear side of the engagement surface of the lockup clutch, heat generated on the engagement surface of the lockup clutch can be efficiently radiated from the plate member, whereby durability of the lockup clutch can be improved.

Moreover, the plate member provided on the second cover member and the piston of the lockup clutch are integrated in a manner to divide a first chamber accommodating the drive and driven impellers and the second chamber accommodating the pendulum damper when the lockup clutch is engaged. Therefore, during engagement, the fluid pressure can no longer be transmitted to the pendulum damper easily, and prevention of a pendulum motion of the inertial mass by the fluid pressure can be suppressed. That is, drop of the damping performance of the torsional vibration in the pendulum damper by the fluid pressure inside the cover member can be suppressed.

In addition, since the plate member provided on the second cover member serves as a lockup engagement surface, judder generated when the lockup clutch is frictionally engaged can be suppressed more than the case in which the lockup engagement surface is formed on the first cover member.

DETAILED DESCRIPTION OF THE PREFERRED EMBODIMENT(S)

The present invention will be described more specifically below. The fluid coupling according to the present invention is a so-called torque converter having torque multiplying function and accommodating a fluid for transmitting the torque inside a cover member and including a device for damping torsional vibration. The vibration damping device includes a so-called pendulum type, and an inertial mass functioning as a weight allowed to oscillate is held by a rotary member rotated by torque, for example. Moreover, the fluid coupling has a function similar to the torque converter widely mounted on prior-art vehicles and includes a lockup clutch inside the cover member. Therefore, the present invention relates to an internal structure of the fluid coupling and particularly relates to arrangement of the torsional vibration damping device in the axial direction and the lockup clutch.

Figure 1:
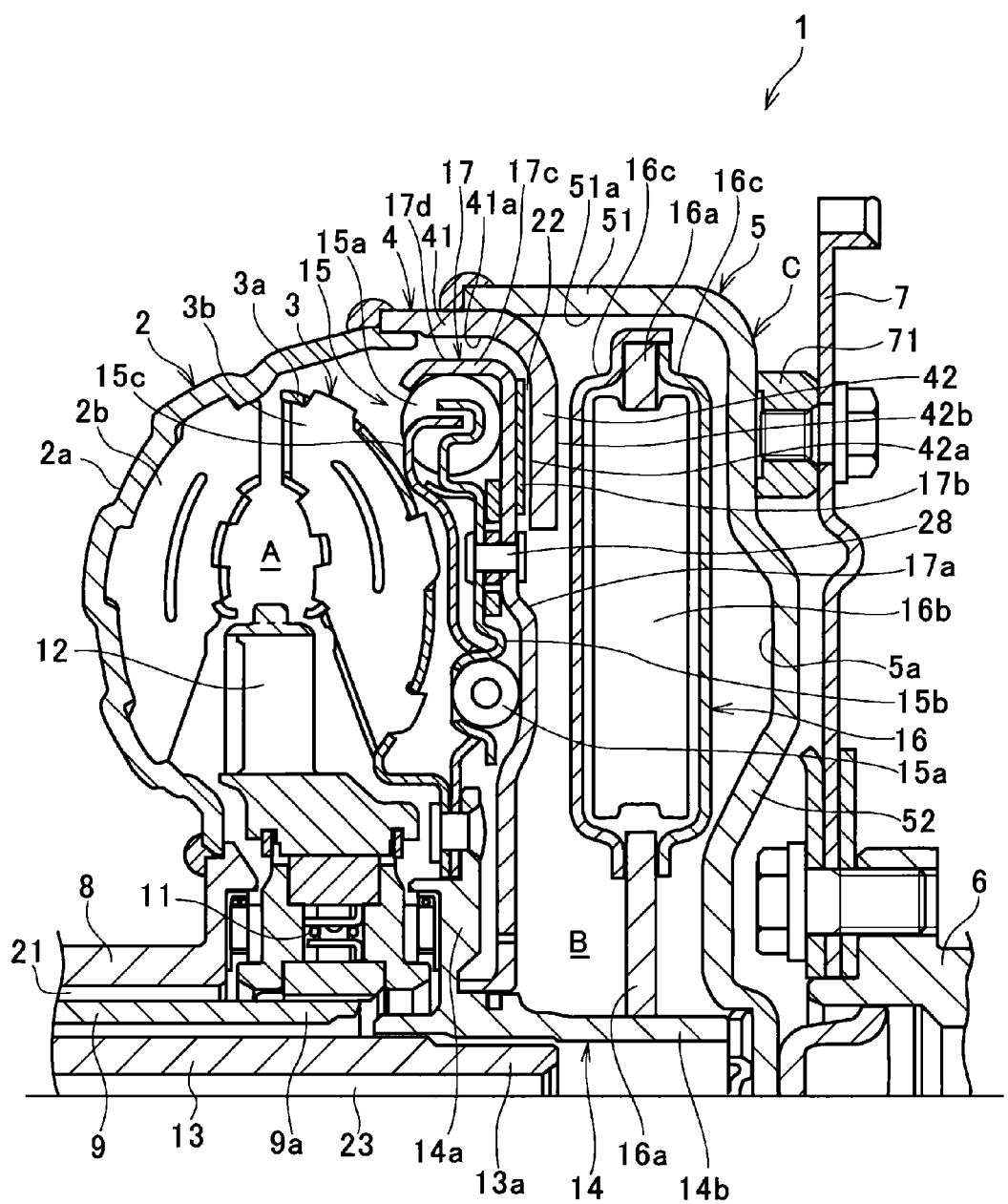
FIG. 1 is a sectional view illustrating one example of a fluid coupling according to the present invention.

By referring to FIG. 1, the fluid coupling in one example of the present invention will be described. The fluid coupling 1 illustrated in FIG. 1 is mounted on a vehicle provided with an internal combustion engine as a prime mover or particularly an engine. Though the engine is not shown in FIG. 1, it is arranged on the right side of the fluid coupling 1 illustrated in FIG. 1. Therefore, in the following description, the right side in the drawing can be called a "front side" or an "engine side" and the left side can be called a "rear side" or a "side opposite to the engine".

As illustrated in FIG. 1, the fluid coupling 1 accommodates oil as a fluid inside a cover member C and includes a pump impeller 2 which is a driving-side rotary member for generating a flow of the oil (spiral flow) and a turbine runner 3 which is a driven rotary member rotated by the spiral flow. In the pump impeller 2, a plurality of pump blades 2b is arranged on an inner surface of an annularly formed pump shell 2a to be rotated integrally therewith. In the turbine runner 3 having a shape substantially symmetrical to the pump impeller 2, a plurality of turbine blades 3b is arranged on an inner surface of the annularly formed or hemi-annular shaped shell 3a. Moreover, the pump impeller 2 and the turbine runner 3 are arranged by facing each other in the axial direction on the same axis. That is, the pump impeller 2 and the turbine runner 3 are arranged in a direction parallel with rotation center axes of the pump impeller 2 and the turbine runner 3 in which the pump impeller 2 is arranged on a front side, while the turbine runner 3 is arranged on a rear side.

Moreover, in this specific example, the cover member C in the fluid coupling 1 includes the pump shell 2a arranged on a side opposite to the engine, a front cover 5 formed having a bottomed cylindrical shape and arranged on the engine side, and a center cover 4 formed annularly and integrally joined to the pump shell 2a and the front cover 5. That is, the front cover 5 is arranged on the front side as the cover member C, while the pump shell 2a is arranged on the rear side, and the center cover 4 is arranged between the front cover 5 and the pump shell 2a. Moreover, as illustrated in FIG. 1, an inner diameter 51a of the cylinder portion 51 provided so as to extend in the axial direction on the front cover 5 is formed larger than an inner diameter 41a of the cylinder portion 41 provided so as to extend in the axial direction in the center cover 4. The front cover 5 corresponds to a "first cover member" in the present invention, the pump shell 2a corresponds to a "second cover member" in the present invention, and the center cover 4 corresponds to a "third cover member" in the present invention.

Specifically, the cylinder portion 51 of the front cover 5 covers the outer peripheral side of a pendulum damper 12 having a mass inertial mass as a pendulum. To a front wall 52 functioning as a bottom portion in the front cover 5, a set block 71 integrated with a drive plate 7 is joined to an outer peripheral side of its outer surface (side surface on the front side) 5b. The drive plate 7 is mounted on a crank shaft 6 of the engine, and the drive plate 7 and the front cover 5 are connected so as to be integrally rotated. That is, the front cover 5 is connected to an input member. Moreover, an inner surface (wall surface on a rear side) 5a of the front wall 52 faces a rear surface of the pump shell 3 and a side surface 42b on the front side (engine side) in a bulkhead plate 42 as illustrated in FIG. 1.

Moreover, the cylinder portion 41 of the center cover 4 covers the outer peripheral side of the turbine runner 3 and the outer peripheral side of a damper mechanism 15 having an elastic member 15a. The center cover 4 has the bulkhead plate 42 provided so as to extend from the cylinder portion 41 to an inner peripheral side, and the bulkhead plate 42 is arranged on the front side in the axial direction in the cylinder portion 41. That is, the center cover 4 is formed into cylindrical shape having an annular bottom portion of the bulkhead plate 42. Moreover, the bulkhead plate 42 is arranged between a lockup clutch 17 and a pendulum damper 16 which will be described later in the axial direction. In other words, the bulkhead plate 42 is arranged on the front side from the damper mechanism 15 in the axial direction and on the rear side from the pendulum damper 16. The center cover 4 is integrally joined to an end portion on the outer peripheral side of the pump shell 2a and is integrally joined to an end portion on the rear side of the front cover 5. Therefore, the pump shell 2a is integrally connected to the front cover 5 through the center cover 4.

Moreover, to the end portion on the inner peripheral side of the pump shell 2a, a hollow shaft 8 is joined. The hollow shaft 8 is formed so as to extend to the rear side farther than the pump shell 2a and is connected to an oil pump, not shown. Therefore, since the pump shell 2a and the hollow shaft 8 are integrally rotated, the oil pump is driven by rotation of the pump shell 2a. For example, as illustrated in FIG. 1, flange portion protruding to the outer peripheral side in the radial direction is formed on a tip end portion on the front side in the hollow shaft 8, and the flange portion and the pump shell 2a are joined together.

Moreover, inside the hollow shaft 8, a fixed shaft 9 formed having an outer diameter smaller than an inner diameter of the hollow shaft 8 and formed hollow is inserted. A front tip end portion 9a in a fixed shaft 9 is arranged inside the fluid coupling 1 surrounded by the pump shell 2a, the center cover 4, and the front cover 5. Moreover, the fixed shaft 9 is a hollow shaft-shaped member formed integrally with a fixed portion, not shown, for holding the oil pump. A space between an outer peripheral surface of the fixed shaft 9 and an inner peripheral surface of the hollow shaft 8 is a flow passage 21. In this specific example, since oil is accommodated as the fluid, the flow passage 21 is explained by being described as an oil channel 21.

Moreover, the tip end portion 9a of the fixed shaft 9 is located on the inner peripheral side of the turbine runner 3 or between the pump impeller 2 and the turbine runner 3 in the axial direction. With an outer peripheral surface on the tip end portion 9a of the fixed shaft 9, an inner lace of a one-way clutch 11 is splined. On an outer lace of the one-way clutch 11, a stator 12 is mounted. The stator 12 is arranged between an inner peripheral portion of the pump impeller 2 and an inner peripheral portion of the turbine runner 5 facing that. That is, when a speed ratio between the pump impeller 2 and the turbine runner 3 is small, rotation of the stator 12 is prevented by the one-way clutch 11 even if the oil flowing out of the turbine runner 3 acts on the stator 12. In this situation, a flowing direction of the oil is changed and the oil is fed into the pump impeller 2. To the contrary, when the speed ratio is larger and the oil hits toward a rear surface of the stator 12, the stator 12 is rotated so as not to disturb the oil flow.

Moreover, as illustrated in FIG. 1, an output shaft 13 serving as an output member of the fluid coupling 1 is inserted into the inner peripheral side of the fixed shaft 9 while being allowed to rotate relatively rotation therewith. The output shaft 13 is a not shown input shaft of a transmission mechanism. Moreover, a tip end portion 13a of the output shaft 13 protrudes to the engine side from a tip end portion 9a of the fixed shaft 9 in the axial direction and is provided extending close to the front wall surface 5a of the front cover 5. Moreover, on an outer peripheral surface of the tip end portion 13a of the output shaft 13, a hub shaft 14 formed having a hollow shape is splined.

The hub shaft 14 has a hub 14a formed having a flange shape arranged on a rear side in the axial direction and protruding to the outer peripheral side and a cylinder portion 14b formed on a front side thereof. To the hub 14a, the turbine runner 3 and the damper mechanism 15 are connected so as to be integrated with the hub 14a. Moreover, to the cylinder portion 14b, a rotary member 16a comprising a part of the pendulum damper 16 which will be described later is connected so as to be rotated integrally. That is, the hub shaft 14 is adapted to rotate integrally with the damper mechanism 15 and the pendulum damper 16.

The damper mechanism 15 comprising a part of the torsional vibration damping device in the present invention and is called a so-called torsional damper and includes the input element 15b, an elastic member 15a elastically deformed by the torsional vibration, and an output element 15c. The input element 15a is connected to a lockup piston 17a of the lockup clutch 17 so as to integrally rotate. Moreover, the elastic member 15a includes a member expanded and compressed in the rotating direction, that is, in a circumferential direction such as a coil-shaped spring. On the other hand, the output element 15c is connected to the hub 14a of the hub shaft 14 so as to integrally rotate. As illustrated in FIG. 1, a side surface on the front side of the input element 15b is faced with a side surface on the rear side of the lockup piston 17a, and the input element 15b and the lockup piston 17a are connected through a connecting member 28. That is, the fluid coupling 1 includes the lockup clutch 17 as an input member in the damper mechanism 15 and also includes the hub shaft 14 as an output member. Moreover, the damper mechanism 15 is arranged so as to be adjacent to the turbine runner 3 and is particularly arranged so as to follow a rear surface (surface on the front side) of the turbine runner 3, that is, a surface faced with the front wall surface 5a. Therefore, the damper mechanism 15 is arranged between the turbine runner 3 and the lockup piston 17a of the lockup clutch 17 in the axial direction.

The lockup clutch 17 transmits a torque between the input member and the output member without through a fluid (oil) similarly to those conventionally known. That is, the lockup clutch 17 is adapted to selectively connect the pump impeller 2 serving as the input member and the turbine runner 3 serving as the output member. In other words, the lockup clutch 17 selectively connects the front cover 5 serving as the input member and the output shaft 13 serving as the output member.

Specifically, the lockup clutch 17 is comprised mainly of the lockup piston 17a formed having a disk shape. The lockup piston 17a is fitted with the hub shaft 14 movably in the axial direction and capable of relative rotation in the rotating direction. In a side surface on the front side of the lockup piston 17a, a spot faced with a side surface 42a on the rear side of the bulkhead plate 42, that is, on as far as the outer peripheral side, a friction material 17b generating a friction force by being pressed onto the bulkhead plate 42 of the center cover 4 is mounted. That is, the side surface on the front side of the lockup piston 17a is faced with the side surface 42a on the rear side of the bulkhead plate 42 and the front wall surface 5a of the front cover 5. In short, the lockup clutch 17 (lockup piston 17a) is arranged between the damper mechanism 15 and the bulkhead plate 42 of the center cover 4 in the axial direction. That is, the internal structure of the fluid coupling 1 has a first chamber A accommodating the pump impeller 2, the turbine runner 3, and the damper mechanism 15 so as to be surrounded by the pump shell 2a, the center cover 4, and the lockup piston 17a.

On an end portion on the outer peripheral side of the lockup piston 17a, an outer peripheral portion 17c extending in the axial direction so as to follow the inner peripheral surface of the cylinder portion 41 is formed. The outer peripheral portion 17c is formed having a cylindrical shape or a fork shape provided at an equal interval in the circumferential direction. Moreover, an outer diameter 17d of the lockup piston 17a is formed smaller than the inner diameter 41a of the cylinder portion 41 of the center cover 4. That is, the outer diameter 17d of the outer peripheral portion 17c of the lockup piston 17 is formed having a diameter slightly smaller than the inner diameter 41a of the cylinder portion 41.

Therefore, the lockup piston 17a is configured to be pressed in the right direction in FIG. 1 by the fluid pressure in the fluid coupling 1 and the friction member 17b is brought into contact with the side surface 42a of the bulkhead plate 42 so that the torque is transmitted frictionally between the center cover 4 and the hub shaft 14. That is, the side surface 42a of the bulkhead plate 42 serves as an engagement surface to be engaged with the lockup clutch 17. On the other hand, when the lockup piston 17a is pushed back to the left direction in FIG. 1 by the fluid pressure, the friction member 17b is isolated away from the bulkhead plate 42 to bring the lockup clutch 17 into disengagement thereby interrupting torque transmission through the damper mechanism 15. In this situation, a slight gap is created between the side surface on the front side of the lockup piston 17a and the side surface 42a of the bulkhead plate 42, and the gap thus created serves as a flow passage (oil passage) 22.

Then, the oil flowing through the oil channel 22 from inside the first chamber A flows into the front cover 5 accommodating the pendulum damper 16. That is, the internal structure of the fluid coupling 1 has a second chamber B accommodating the pendulum damper 16 so as to be surrounded by the front cover 5, the center cover 4, and the lockup piston 17a. Therefore, the pendulum damper 16 is arranged by being sandwiched by the side surface 42b on the front side of the bulkhead plate 42 and the front wall surface 5a of the front cover 5 in the axial direction.

The pendulum damper 16 such as a dynamic damper is a part of the torsional vibration damping device of the present invention, and the pendulum damper 16 comprises the rotary member 16a rotated by the torque of the hub shaft 14, the inertial mass 16b serving as a weight oscillating relatively with respect to the rotary member 16, and a holding chamber 16c holding the inertial mass 16b therein. Specifically, through holes are formed on an outer circumferential side of the rotary member 16a and the inertial mass 16b is individually held in each through hole while being allowed to oscillate in the rotational direction of the hub shaft 14. In the following explanation, the inertial mass 16b will also be called the rolling member 16b.

In short, the holding chamber 16c is arranged on the outer circumferential side of the rotary member 16a in the pendulum damper 16 in the present invention, and the shape of the holding chamber 16c is not particularly limited. For example, the shape of the holding chamber 16c includes such a shape having a wavy surface on the outer peripheral side and an arcuate surface on the inner peripheral side. In the holding chamber 16 thus structured the rolling member 16b is held in a space between protrusions of the outer peripheral side. Alternatively, through holes may be arranged at an equal interval in the circumferential direction are provided on the outer peripheral portion of the rotary member 16a, and a unit of the through holes is made the holding chamber 16c.

Moreover, the rolling member 16b is a disk-shaped weight as an example and its outer diameter is smaller than a maximum interval between a surface on the outer peripheral side and a surface of the inner peripheral side forming the holding chamber 16c and is set larger than a minimum interval on the both sides of the holding chamber 16c. That is, the rolling member 16b is allowed to be moved in a right-and-left direction in FIG. 1 in a state accommodated inside each holding chamber 16c. The surface on the outer peripheral side of each holding chamber 16c is a surface with which the rolling member 16b is brought into contact when receiving a centrifugal force and a surface along which the rolling member 16b is made to follow, that is, a rolling surface. Therefore, in the outer peripheral side of the holding chamber 16c, the both right and left sides in the rotating direction starting from a center part as a starting point is formed as a toroidal surface, for example.

Moreover, the pendulum damper 16 in this specific example includes a housing 16d formed so as to cover the holding chamber 16c while the rolling member 16b is allowed to roll on the rolling surface. That is, the housing 16d and the rotary member 16a are integrally rotated. As described above, since the holding chamber 16c is covered by the housing 16d, direct or indirect acting on the rolling member 16b of the hydraulic pressure in the second chamber B when the hydraulic pressure by the oil accommodated in the front cover 5 or particularly the lockup clutch 17 is disengaged can be suppressed. Moreover, as illustrated in FIG. 1, since the pendulum damper 16 is arranged in the second chamber B inside the front cover 5, a side surface on a front side of the housing 16d is arranged so as to be faced with the front wall surface 5a and a side surface on a rear side of the housing 16d is arranged so as to be faced with the side surface 42b on the front side of the bulkhead plate 42, that is, the side surface 42b on the side opposite to the lockup engagement surface 42a in the bulkhead plate 42.

Moreover, on the output shaft 13, a flow passage (oil passage) 23 is formed along its center axis, and this oil channel 23 is opened in a tip end portion on the front side of the output shaft 13. Moreover, as illustrated in FIG. 1, there is a slight gap between the front wall surface 5a of the front cover 5 and the tip end portion on the front side of the hub 14. Therefore, the oil channel 23 communicates with a portion on the front side of the lockup piston 17a through the gap, that is, with the second chamber B. On the other hand, with a portion on the rear side of the lockup piston 17a, that is, with the first chamber A, the oil channel 21 communicates as described above.

Therefore, given that this oil channel 21 is an engagement oil channel 21 and the oil channel 23 is a disengagement oil channel 23, by making the hydraulic pressure of the engagement oil channel 21 higher than the hydraulic pressure of the disengagement oil channel 23, the hydraulic pressure in the first chamber A becomes higher than a pressure between the lockup piston 17a and the bulkhead plate 42, that is, the hydraulic pressure in the second chamber B. As a result, the lockup piston 17a is pressed onto the bulkhead plate 42 side and the friction member 17b is pressed onto the side surface 42a on the rear side of the bulkhead plate 42. That is, the lockup clutch 17 is brought into the engaged state, and transmission of the torque is generated by a friction force between the friction member 17b of the lockup clutch 17 and the lockup engagement surface 42b of the bulkhead plate 42. The lockup piston 17 is connected to the hub shaft 14 capable of transmitting the torque through the damper mechanism 15, and the turbine runner 3 is mounted on the hub shaft 14 and thus, power is directly transmitted from the center cover 4 through the lockup clutch 17 to the turbine runner 3 or the output shaft 13. That is, in the lockup engagement state, the torque is transmitted without sliding caused by intervention of the fluid, and torque transmission efficiency is improved.

Moreover, in this specific example, when the lockup clutch 17 is engaged, the bulkhead plate 42 provided on the center cover 4 and the lockup piston 17a are frictionally engaged and integrated. For this reason, the internal space of the fluid coupling 1 is divided into the first chamber A accommodating the turbine runner 3 and the damper mechanism 15 and the second chamber B accommodating the pendulum damper 16.

To the contrary, by making the hydraulic pressure of the engagement oil channel 21 lower than the hydraulic pressure of the disengagement oil channel 23, a pressure between the lockup piston 17a and the bulkhead plate 42, that is, the hydraulic pressure in the second chamber B becomes higher than the hydraulic pressure in the first chamber A. As a result, the lockup piston 17a is pressed in the direction separated away from the bulkhead plate 42, and the friction member 17b is separated away from the side surface 42a on the rear side of the bulkhead plate 42. Therefore, the lockup clutch 17 is brought into the disengaged state, and the transmission of the torque between the bulkhead plate 42 and the lockup piston 17a is shut off.

In the disengagement state of the lockup clutch 17, transmission of power through the fluid is possible. Specifically, the engine torque is transmitted through the drive plate 7 to the front cover 5, the center cover 4, and the pump shell 2a and thus, the pump impeller 2 is rotated, and a spiral flow of the oil is generated. The oil which becomes the spiral flow is supplied from the outer peripheral side of the pump blade 2b to the turbine runner 3, and the turbine runner 3 is rotated by motion energy of the oil. As described above, the power is transmitted from the pump impeller 2 which is the impeller on the driving side to the turbine runner 3 which is a driven impeller. Since the turbine runner 3 and the pendulum damper 16 are connected to be integrally rotated through the hub shaft 14, the power is transmitted from the turbine runner 3 to the output shaft 13 and outputted, and the rotary member 16a of the pendulum damper 16 is rotated with the turbine runner 3. As a result, vibration transmitted to the output shaft 13 can be damped by the pendulum damper 16.

For example, if the rotation speed of the engine or the rotation speed of the input member of the fluid coupling 1 (rotation speed of the pump shell 2a) becomes high due to an increase in the vehicle speed of the vehicle on which the fluid coupling 1 is mounted, improvement of the torque transmission efficiency is needed more than the torque multiplying function by the fluid coupling 1, and the lockup clutch 17 is engaged. On the other hand, if the fluid coupling 1 is mounted on the vehicle and the engine rotation speed is low since the vehicle is stopped or the like, or if the output torque of the engine or the accelerator opening degree is large, the lockup clutch 17 is controlled to the disengaged state in order to reduce vibration of the vehicle body, a booming noise and the like.

As described above, according to the fluid coupling in this specific example, in the internal structure of the fluid coupling, by arranging the turbine runner, the damper mechanism having the elastic body, the lockup clutch, the bulkhead plate constituting the lockup engagement surface, and the pendulum damper in order in the axial direction, the axial length of the fluid coupling can be reduced.

Moreover, the bulkhead plate constituting the lockup engagement surface is provided between the damper mechanism having the elastic member in the axial direction and the pendulum damper. Thus, even if the damper mechanism having the elastic body is arranged by utilizing the space in the radial direction between the turbine runner and the cover member, the internal space of the cover member can be utilized large in the radial direction as the space for arranging the pendulum damper. That is, since the pendulum damper and the front cover are arranged so as to face each other in the radial direction, the space for arranging the pendulum damper is not hindered by the structure of the damper mechanism or the lockup clutch. Therefore, since the pendulum damper can utilize the internal space of the cover member C large in the radial direction, the distance from the rotation center in the rotary member of the pendulum damper to the inertial mass can be made large, and the inertia moment by the pendulum damper acting on the output shaft can be made large. That is, according to this specific example, the internal space of the fluid coupling can be effectively utilized, and the damping performance of the torsional vibration by the pendulum damper can be sufficiently exerted.

Moreover, by engaging the lockup clutch, the first and the second chambers are divided from each other in the internal space of the fluid coupling and thus, the hydraulic pressure cannot be transmitted easily to the pendulum damper, and hindrance of the pendulum motion of the inertial mass by the hydraulic pressure can be suppressed. That is, drop of the damping performance of the torsional vibration in the pendulum damper by the hydraulic pressure inside the cover member can be suppressed. In addition, in the bulkhead plate, since the fluid such as the operating oil is also intervened on the rear side (side surface on the front side) of the lockup engagement surface, the heat generated on the lockup engagement surface can be efficiently radiated from the bulkhead plate, and the durability of the lockup clutch can be improved.

In addition, the front cover includes a welded surface (set block-welded surface) between a set block and the front cover. Thus, in the constitution with the inner surface of the front cover as the lockup engagement surface, the shape of the lockup engagement surface becomes unstable in some cases by the set block-welded surface on the outer surface of the front cover. On the other hand, according to this specific example, since the front cover integrated with the drive plate and the center cover on which the bulkhead plate constituting the lockup engagement surface is provided are provided as the cover member of the fluid coupling, when the lockup clutch is frictionally engaged, the so-called judder phenomenon can be suppressed.

Next, by referring to FIG. 2, another specific example of the fluid coupling will be described. In the example shown therein, the pendulum damper is not provided with a housing for accommodating the holding chamber. In the fluid coupling illustrated in FIG. 2, the inertial mass is exposed in the second chamber accommodating the pendulum damper. In the following explanation, detailed explanation for the elements in common with those in the aforementioned specific example will be omitted using common reference numerals.

Figure 2:
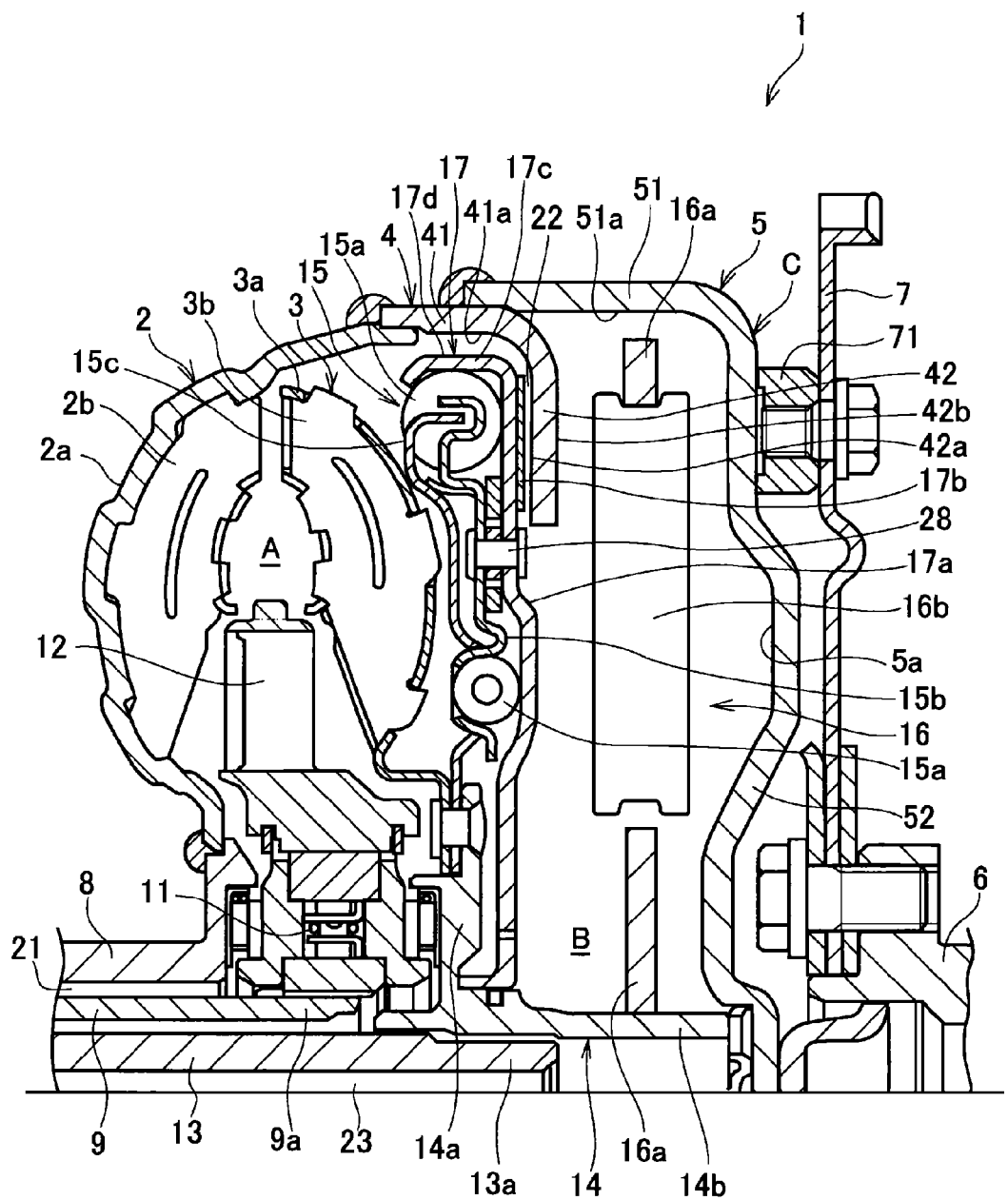
FIG. 2 is a sectional view illustrating another example of a fluid coupling according to the present invention.

As illustrated in FIG. 2, the fluid coupling 1 has the pendulum damper 26 inside the front cover 5. The pendulum damper 26 comprises a rotary member 26a rotated integrally with the cylinder portion 14b of the hub shaft 14 and a inertial mass 26b serving as a weight oscillating relatively with respect to the rotary member 26a, and a holding chamber 26c holding the inertial mass 26b therein. Specifically, through holes are formed on an outer circumferential side of the rotary member 26a and the inertial mass 26b is individually held in each through hole while being allowed to oscillate in the rotational direction of the hub shaft 14. In the pendulum damper 26 shown in FIG. 2, the rolling body 26 held in the holding chamber 26c is exposed in the second chamber B formed inside the front cover 5.

According to the example shown in FIG. 2, since the holding chamber is open in the second chamber, the oil in the second chamber can lubricate the surface of the rolling body and the rolling surface. As a result, abrasion resistance of the pendulum damper is improved, and durability can be improved.

The fluid coupling according to the present invention is not limited to the aforementioned specific example but various changes and modifications can be made within the spirit and scope of the present invention.

For example, in the pendulum damper provided with the housing covering the holding chamber, the internal space of the front cover and the internal space of the housing may be connected through a relatively small through hole formed in the housing. As described above, even the pendulum damper provided with the housing can lubricate the rolling surface with the oil in the second chamber.

REFERENCE SIGNS LIST

1: fluid coupling; 2: pump impeller; 2a: pump shell; 3: turbine runner; 4: center cover; 5: front cover; 5a: front wall surface; 6: crank shaft; 7: drive plate; 8: hollow shaft; 9: fixed shaft; 11: one-way clutch; 12: stator; 13: output shaft; 14: hub shaft; 14a: hub; 14b: cylinder portion; 15: damper mechanism; 15a: elastic member; 15b: input element; 15c: output element; 16: pendulum damper; 16a: rotary member; 16b: rolling member (inertial mass); 17: lockup clutch; 17a: lockup piston; 17b: friction member; 17c: outer peripheral portion; 21, 22, 23: flow passage (oil passage); 26: pendulum damper; 41: cylinder portion; 42: bulkhead plate (plate member); 42a: side surface (lockup engagement surface); 51: cylinder portion; 52: front wall; 71: set block; A: first chamber; B: second chamber; C: cover member.

The invention claimed is:
1. A fluid coupling comprising:
a cover member connected to an input member and accommodating a fluid;
a drive impeller that creates a spiral flow by a rotation of the cover member;
a driven impeller connected to an output member which includes a rotary shaft having an axis, and the driven impeller is rotated by the spiral flow;
a lockup clutch hydraulically actuated to selectively provide a connection between the cover member and the output member;
a damper mechanism having an input element connected to the lockup clutch, an output element connected to the output member, and an elastic member arranged between the input element and the output element in such a manner to be expanded and compressed in a rotational direction; and
a pendulum damper having an inertial mass oscillating with respect to the output member, that is connected to the output member to be rotated in the rotational direction of the output member;
wherein the driven impeller, the damper mechanism, the lockup clutch, and the pendulum damper are arranged in this respective order in a direction of the axis of the rotary shaft in the cover member.

2. The fluid coupling as claimed in claim 1, wherein the cover member includes a plate member protruding toward a rotation center axis of the rotary shaft to serve as an engagement surface of the lockup clutch.

3. The fluid coupling as claimed in claim 2, wherein the plate member is arranged between the lockup clutch and the pendulum damper in the axial direction.

4. The fluid coupling as claimed in claim 2, wherein an internal space of the cover member is divided into a first chamber accommodating the driven impeller and the damper mechanism and a second chamber accommodating the pendulum damper by the plate member and the lockup coupling clutch, by bringing the lockup clutch into engagement.

5. The fluid coupling as claimed in claim 1, wherein the cover member includes a first cover member covering an outer periphery of the pendulum damper, a second cover member integrated with the driving-side impeller to cover an outer peripheral side of the driven impeller, and a third cover member integrated with the plate member to cover an outer peripheral side of the lockup clutch.

6. The fluid coupling as claimed in claim 5, wherein an inner diameter of the first cover member is larger than an inner diameter of the third cover member.

* * * * *